Patented Apr. 13, 1926.

1,580,550

UNITED STATES PATENT OFFICE.

JOHN F. WROTEN, OF BALTIMORE, MARYLAND, ASSIGNOR TO LIBERTY YEAST CORPORATION, A CORPORATION OF MARYLAND.

PROCESS OF YEAST MANUFACTURE.

No Drawing.  Application filed August 20, 1924. Serial No. 733,194.

*To all whom it may concern:*

Be it known that I, JOHN F. WROTEN, a citizen of the United States, and a resident of the city and county of Baltimore, State of Maryland, have invented certain new and useful Improvements in Processes of Yeast Manufacture, of which the following is a specification.

This invention relates to yeast manufacture and more particularly to a process in which bone precipitate is employed as an active agent. Among the objects of this invention is the production of yeast by a process, whose cost is materially lower than other processes and wherein a large yield of yeast of high quality results.

The nature of my discovery and invention will appear from the following description and the claims.

A wort containing, in solution, nitrogenous material, saccharine matter and mineral salts, is prepared. The wort may include cereal materials, such as rye, barley, malt and sprouts, or such saccharine matter as molasses or both cereal materials and molasses. Grain extracts, which are partly malted, and molasses, preferably beet molasses, may be employed, the amount of molasses by weight being preferably at least twice as much as the amount by weight of grains. Prior to propagation of yeast therein, the wort is soured by inoculation with a lactic acid culture, preferably to the extent that the acidity of 40 c. c. will require, for neutralization, from 20 c. c. to 30 c. c. of a tenth normal soda solution. After souring, the wort which is of comparatively high Balling per cent, such as from 8° to 30°, is filtered and transferred to a container where it is kept at a sterilizing temperature, such as 65° cent. preferably for at least one hour. The wort is then transferred directly to a fermenter.

Before propagation of yeast therein, a part of the wort is diluted to about 1.5° Balling and then yeast propagation is commenced, seed yeast being added to such diluted portion in a quantity approximately 8 per cent of the total raw materials. Parts of the original wort are added from time to time in accordance with the growth requirements of the yeast.

In the processes of yeast manufacture which have heretofore been employed, ammonium phosphate has been added to the wort either before or during fermentation to supply phosphorous to the yeast in amounts varying with the nature of the wort, as is well known in the art. I have discovered that the material known in the fertilizer trade as "bone precipitate" or "precipitated bone phosphate" and which is a calcium phosphate compound, produced by the treatment of bone with acid, and the subsequent precipitation of the phosphoric acids with lime, may be very usefully employed in yeast manufacture. Calcium compounds and phosphoric acid compounds are necessary to the proper growth of the yeast and also affect the acidity of the fermenting wort. An analysis of the bone precipitate which I have employed is as follows: Moisture, dried at 100° cent.—5.00%; insoluble siliceous matter—0.26%; di-calcium phosphate $Ca HPO_4 2H_2O$—92.5%; mono-calcium phosphate $Ca(H_2PO_4)_2$—2.07%.

The bone precipitate may be substituted in whole or in part for ammonium phosphate or for other phosphorus compounds, such as phosphorus acid, phosphoric acid, phosphates of alkali metals or of alkali earths.

What I claim is:

1. In a yeast fermentation process, the step of adding bone precipitate to the wort to be fermented.

2. A fermentable solution for the growth of yeast, containing bone precipitate.

JOHN F. WROTEN.